United States Patent
Weissinger et al.

[11] Patent Number: 5,669,361
[45] Date of Patent: Sep. 23, 1997

[54] VEHICLE REFUELING VALVE

[75] Inventors: Peter G. Weissinger, Rock Falls; Tibor Baron, Decatur; Manuel D. Rosas, Coleta, all of Ill.

[73] Assignee: Borg-Warner Automotive, Inc., Sterling Heights, Mich.

[21] Appl. No.: 601,814

[22] Filed: Feb. 15, 1996

[51] Int. Cl.[6] .................................. F02M 37/04
[52] U.S. Cl. ..................... 123/520; 137/587; 137/110
[58] Field of Search ........................ 123/518, 519, 123/520, 521, 516; 137/587, 588, 110

[56] References Cited

U.S. PATENT DOCUMENTS

| | | | |
|---|---|---|---|
| 4,768,566 | 9/1988 | Ito | 137/588 |
| 4,796,593 | 1/1989 | Woodcock | 123/516 |
| 4,974,645 | 12/1990 | Johnson | 137/587 |
| 5,014,742 | 5/1991 | Covert | 137/588 |
| 5,065,782 | 11/1991 | Szlaga | 137/110 |
| 5,183,087 | 2/1993 | Aubel | 123/518 |
| 5,282,497 | 2/1994 | Allison | 137/588 |
| 5,318,069 | 6/1994 | Harris | 137/110 |
| 5,460,135 | 10/1995 | Ohashi | 123/518 |
| 5,474,048 | 12/1995 | Yamazaki | 137/587 |
| 5,497,800 | 3/1996 | Ohashi | 123/519 |

Primary Examiner—Carl S. Miller
Attorney, Agent, or Firm—Reising, Ethington, et al.; Greg Dziegielewski

[57] ABSTRACT

A refueling valve for a motor vehicle includes an integrated control valve therein having a vent tube that has a first valve seat on one end thereof and a second valve seat on the other end thereof that cooperate respectively with a float valve and with a diaphragm controlled pressure responsive cut-off valve that is operative in accordance with a sensed pressure condition in a fuel filler pipe to control fuel venting to a charcoal canister and to prevent the escape of fuel vapors from a filler neck. The diaphragm is communicated with a pressure sensing port in the filler neck below a trap door therein that opens during refueling and is closed once the fuel nozzle is removed. The pressure sensing pot is located upstream of a venturi that produces negative pressure at the pressure sensing port and on the diaphragm member. A spring biases the cut-off valve normally closed. The diaphragm is responsive to a reduced pressure condition in the filler neck to open the cut-off valve to allow vapors to be vented from the fuel tank to the charcoal canister during refueling.

13 Claims, 2 Drawing Sheets

VEHICLE REFUELING VALVE

TECHNICAL FIELD

This invention relates to fuel tank venting and more particularly to refueling valves with fuel vapor vents that are operative during refueling to direct fuel vapors to a charcoal canister.

BACKGROUND OF THE INVENTION

Fuel tank venting systems are known in which a filler neck carries a vapor control valve having a mechanically controlled vent valve and a ball valve that floats to seal a vapor vent opening when the fuel tank is filled so as to prevent the flow of liquid fuel into a charcoal canister. Examples of such venting systems are set-forth in U.S. Pat. Nos. 4,724,861 and 4,893,643.

In other fuel tank venting systems a vapor vent opening on the filler neck is opened and closed in response to the position of a seal cap assembly or closure member on the end of the filler neck. An example of such venting systems is set-forth in U.S. Pat. No. 4,813,453.

While suitable for their intended purpose, the arrangements require installation of vent valve components in the filler neck. In the case of onboard vapor recovery systems a rollover refueling valve is also provided to provide running loss flow of vapors from a fuel tank.

In the typical fuel vapor vent valve providing such a rollover refueling and running loss vapor control for a motor vehicle fuel tank, the valve is adapted to prevent spillage in case of shaking, tilting or rollover of the vehicle, the valve normally opens the fuel tank to an orifice that is connected by a vapor exit passage in the valve body to a vapor hose leading to a fuel vapor storage device. The valve body is commonly made as a one-piece plastic injected molded part that for simplicity of design has a simple direct connection between the orifice and the vapor exit passage. However, this connection has a tendency to collect and pass any liquid fuel issuing from the orifice under pressure from the tank on to the vapor storage canister. The latter contains a fuel vapor absorber such as carbon and any liquid fuel delivered thereto will quickly reduce its vapor adsorbing ability. It is difficult to configure the top of the molded body with a vapor exit passage connection that would somehow trap this liquid after it passes through the orifice and then drain the trapped liquid back to the tank. This is also the case where the valve is omitted and only venting is provided through an orifice in a vent body that mounts on the fuel tank.

As to any such possible fuel drainage back to the tank in the case of a vent assembly having a valve that is adapted to block the orifice on overfill, vehicle shaking, tilting and/or vehicle rollover, there is also the consideration of adversely affecting the operation of the valve as it is required to provide for normal venting operation in an upright position but close under these various circumstances to block exit of fuel from the tank. Any such drainage path for liquid fuel trapped downstream of the orifice can not provide a possible path for fuel vapor to vent around the valve in the normal upright attitude of the tank or allow liquid fuel to escape from the tank when tipped or inverted. An example of such systems is set-forth in U.S. Pat. No. 5,044,389, assigned to the assignee of the present invention.

One solution to such problems is set-forth in U.S. Pat. No. 5,413,137, also assigned to the assignee of the present invention. The fuel vapor vent assembly set-forth in the '137 patent embodies a fuel impervious insert that is adapted to be mounted in such a vent or vent valve body and defines both a vertically oriented vent orifice and a liquid basin extending about the exit of this orifice. A simple cavity formed in the interior of the top of the plastic body co-operates with the basin in the insert to define an expansive chamber elevated above the orifice and this chamber communicates the orifice with a horizontal vapor exit passage in the plastic body adapted to be connected to a vapor storage device. The expansive chamber forms an elevated liquid trap at the exit of the orifice that traps liquid from the venting fuel vapor while permitting venting to continue therethrough and then drains the trapped liquid in the basin back into the tank through the orifice in the insert when the pressure in the fuel tank is relieved. The liquid trapping chamber has a ceiling directly opposite the orifice dead ending the vapor stream issuing therefrom and the vapor exit passage is connected to the expansive chamber at a point above the basin. These features combine to aid in separating any liquid fuel out from the vapor and down into the basin and prevent it from passing on to the vapor exit passage and thence to the vapor storage canister.

While suitable for their intended purpose, the fuel vapor vent assemblies set-forth in the aforesaid prior art patents do not provide a system that combines, in one valve unit, provision to prevent the escape of fuel vapors from the fuel filler neck during refueling while also including provision for venting vapor from the tank during refueling and to prevent such venting upon removal of a fuel nozzle from a filler neck.

It is also known in the prior art as set-forth in copending application 08/555,129 assigned to the assignee of the present invention, to provide such a rollover refueling valve with running loss to vent vapors at the same rate at which the fuel tank is being filled and to provide a predetermined vapor dome space within said tank to accommodate vapor pressure increases when the refueling valve is closed. Further, the rollover refueling valve is configured to locate the valve seat close to the tank top and vent openings are located at the base of a unitary body such that they will be immersed in fuel when the tank level reaches the float so that venting will be restricted as the float moves between its normally open position and its normally closed position. Specifically, the arrangement in 08/555,129 provides a fuel vapor vent device that will vent vapor during fuel fill while preventing liquid fuel flow to a fuel vapor storage canister including a refueling valve having a body with a vapor exit passage and a liquid inlet passage and the body being connected to the top of a fuel tank in depending relationship therewith; the valve including a float and a valving element carried by the float and tiltable with respect to the float for compensating for tilt and further characterized by the body further including a vapor exit port adjacent the top and also including a vent tube with a valve seat located below the vapor exit port for preventing liquid fuel particles from entering the vapor exit passage and further characterized by a baffle ring having an annular base connected to said first tubular member and including an upstanding flange with an I.D. greater than the O.D. of said first tubular member for defining an annular vapor flow path therebetween and said flange further including an O.D. less than the I.D. of said body for defining an annular pocket for trapping fluid; the vapor exit port being formed as a plurality of circumferentially spaced openings in the body member; each of said openings having a lower edge portion located at or below said pocket for draining liquid fuel particles collected therein. The on-board vapor recovery system of 08/555,129 has an additional venting capability provided by a second valve including a second tubular member having a height less than that of said first tubular member and located laterally thereof and including a vent therein in communication with said vapor outlet passage and a float valve within said second first tubular member for closing said vent in response to tilt to prevent escape of liquid fuel from the fuel tank through said vent. The second valve is operative to provide running venting of the fuel tank.

While providing for vapor venting from the fuel tank to a charcoal canister, such arrangements do not provide a system that will close the onboard vent valve following refueling below a completely filled tank without use of solenoid valving or a mechanical linkage between the fuel filler neck module and the vent valving.

Accordingly, an object of the present invention is to provide an onboard refueling vapor recovery (ORVR) system that vents all vapors to the charcoal canister during refueling while preventing the escape of fuel vapor from the filler neck.

Another object of the present invention is to provide such a refueling valve having an integrated control valve for preventing vapor flow therethrough following refueling without use of mechanical linkages or solenoid control valves.

A further object of the present invention is to provide such a control valve that is operative in response to pressure conditions within a filler neck module.

A still further object of the present invention is to provide such a refueling valve and control valve combination wherein the control valve has a vent tube with a first valve seat on one end thereof and a second valve seat on the other end thereof that cooperate respectively with a float valve that is controlled by fuel tank level and with a diaphragm controlled pressure responsive cut-off valve that is operative in accordance with a sensed pressure condition in a fuel filler pipe and in combination controlling fuel venting to a charcoal canister and to prevent the escape of fuel vapor from a filler neck during refueling.

A still further object is to provide such a refueling valve in which the control valve includes a cover having an inlet connected to a tube that connects to a pressure sensing port formed in the filler neck below a trap door therein that opens during refueling and is closed once the fuel nozzle is removed. The pressure sensing port directs pressure against a diaphragm member that is sealed between the cover and the outlet end of the vent port. A spring engages the diaphragm to bias a cut-off valve element thereon normally closed. The diaphragm member is responsive to a predetermined pressure at the pressure sensing port to open the refueling valve to allow vapors to be vented from the fuel tank to the charcoal canister during refueling.

THE DRAWINGS

The presently preferred embodiment of the invention is disclosed in the following description and in the accompanying drawings, wherein.

DETAILED DESCRIPTION

Figure 1:
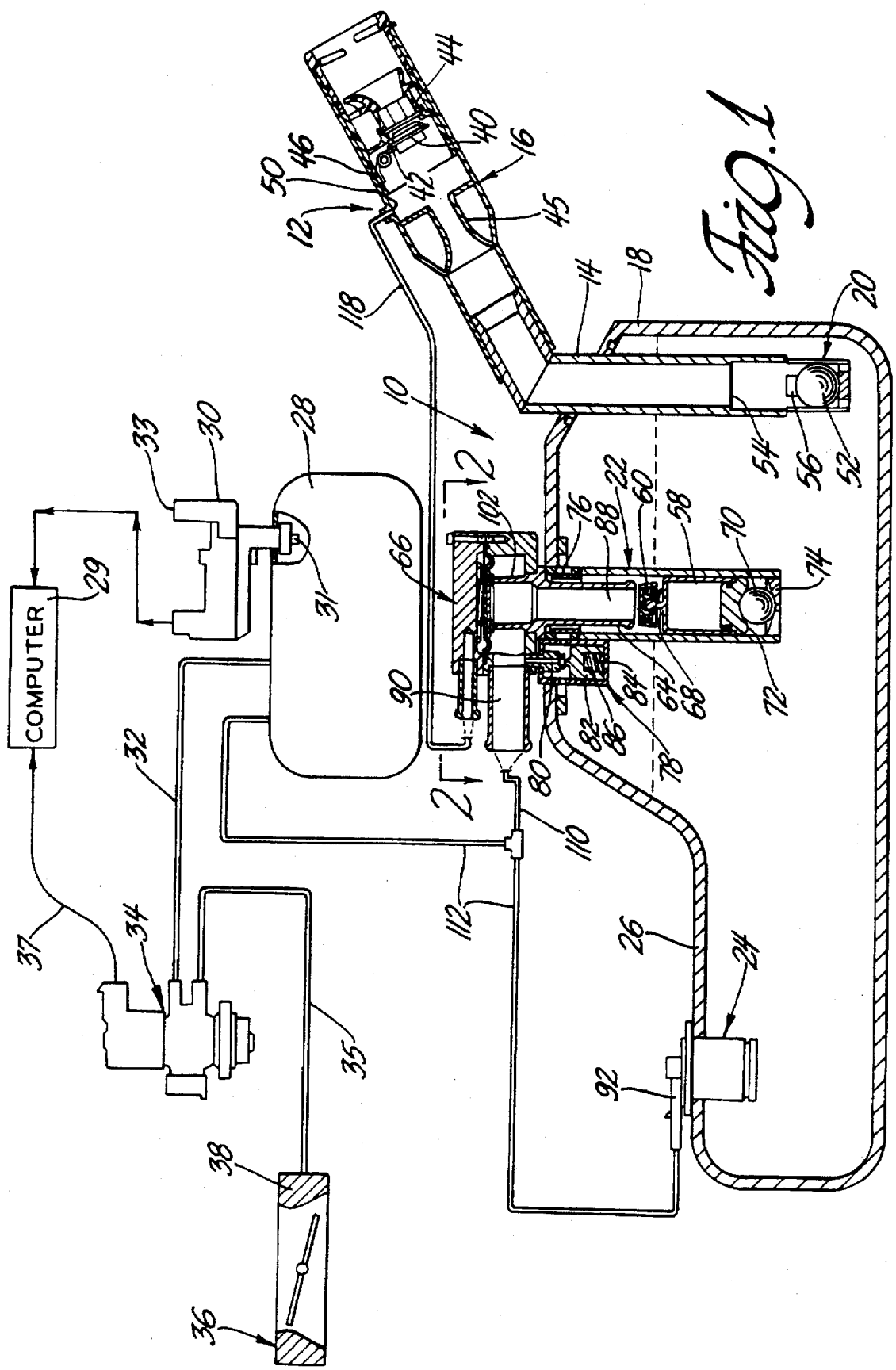
FIG. 1 is a diagrammatic view of an on-board refueling vapor recovery system including the present invention.
Figure 2:
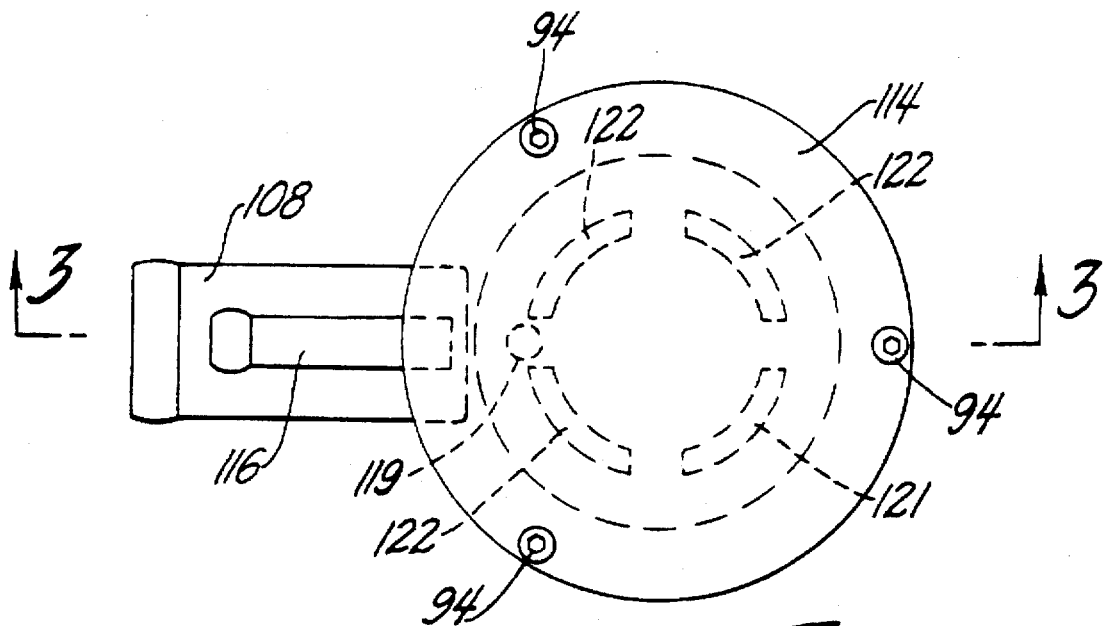
FIG. 2 is an enlarged top elevational view taken along the line 2—2 of FIG. 1 looking in the direction of the arrows.
Figure 3:
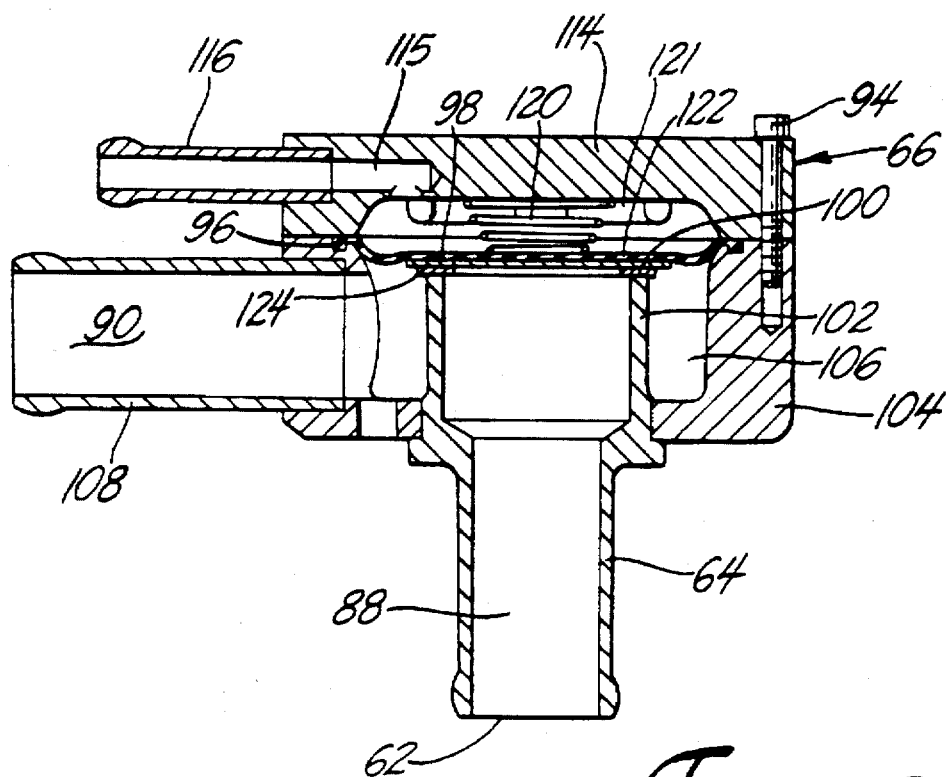
FIG. 3 is a sectional view taken along the line 3—3 of FIG. 2 looking in the direction of the arrows.

Referring to FIG. 1, an onboard refueling vapor recovery (ORVR) system 10 that comprises a filler neck module 12 that is located at the upper end of a fuel filler pipe 14. The filler neck module is located above a liquid seal 16 that separates the filler neck module 12 from a fuel filler pipe that depends downwardly and vertically of a fuel tank 18. The bottom end of the fuel filler pipe incorporates a check ball valve assembly 20.

The ORVR system 10 further includes a rollover refueling vent valve with running loss capability illustrated generally by the reference numeral 22. Additionally, the ORVR system 10 includes a rollover valve 24 provided to accommodate a reduced height shaped portion 26 of the fuel tank 18. The rollover refueling valve 22 and the rollover valve 24 are connected to a charcoal canister 28.

The charcoal canister 28 carries a canister vent solenoid operated valve 30. A purge line 32 is connected between the charcoal canister 28 and the inlet of a duty cycle purge solenoid operated valve 34 that, in turn, is connected to purge vapors from the charcoal canister 28 to the fuel inlet system 36 at a throttle body 38 thereof. Purge valves and their operation are well known to those skilled in the art so that a detailed description is not necessary.

By way of example U.S. Pat. No. 5,237,980 granted to William C. Gillier Aug. 24, 1993 discloses a solenoid purge valve and copending patent application Ser. No. 08/466,251 filed by applicant on Jun. 6, 1995 discloses an improved solenoid purge valve which are suitable.

During the refueling operation the canister vent solenoid valve assembly 30 is a normally open valve. It is closed during diagnostic testing of the ORVR system. When the system is pressurized initially for testing, a valve element (not shown) of the vent solenoid valve assembly 30 is closed so that the system can be checked for leakage.

Following system diagnostic testing, the solenoid valve assembly 30 is electrically connected to a suitable computer 29 for producing a pulse width modulation control of the valve assembly to cyclically open and close it at frequencies of up to 10 Hz. The canister vent solenoid valve assembly 30 has inlet and outlet ports 31, 33 that are designed to have a large enough flow area to prevent any vapor flow restriction during the operation of the system.

A duty cycle purge solenoid valve assembly 34 is operative in response to energization signals from the computer 29 to cycle at a frequency that will purge the fuel vapors from the charcoal canister to the intake manifold of a vehicle through a suitable fuel supply system, e.g., at the throttle body 38 illustrated in FIG. 1. The solenoid duty cycle is maintained at different control rates as controlled by the computer 29 to match the vapor purging action in accordance with vehicle engine operation.

The fuel filler neck module is set forth more specifically in U.S. Pat. No. 5,439,129 assigned to the assignee of the present invention and incorporated herein by reference. For purposes of the present invention it is only necessary to point out that the filler neck module 12 is used as a secondary seal when a driver forgets to put a fuel cap in place following a fuel fill operation. The filler neck module 12 includes a trap door 40 that will seal against a seat 42 after a fuel nozzle is removed from the filler neck module 12. The trap door 40 carries an annular seal 44 that seals against the seat 42 and is spring biased with respect thereto by a return spring 46 as is more specifically set forth in the aforementioned '129 patent.

In the present invention the liquid seal 16 has a venturi 45 that is operative during flow of fuel therethrough when a fill nozzle is inserted into the fuel filler neck to create a pressure condition less than atmospheric pressure and of a magnitude that will condition a control valve diaphragm in a manner to be discussed. Furthermore, the venturi 45 will create a pressure differential thereacross such that immediately upstream of the venturi 45 a pressure condition is produced that is less than atmospheric pressure at the end of the filler neck. Thus, the fuel flowing into the fuel tank through the fuel filler pipe 14 will draw vapors into the fuel tank 18 to prevent vapors from escaping out of the filler neck module 12 during fuel filling operation.

In accordance with one aspect of the present invention, the check ball valve 20 is configured to prevent fuel buildup in the fuel tank from passing up through the fuel filler pipe 14 and out to atmosphere during the refueling process. More importantly, it prevents backflow of fuel to a pressure sensing port or opening 50 in the fuel filler neck module 12 that is located between the fuel filler neck module 12 and the liquid seal 16 to sense a predetermined pressure therebetween that is indicative of the refueling operation as liquid fuel is directed through the filler pipe 14.

In the illustrated arrangement, the check ball valve assembly 20 includes a ball element 52 that is buoyant and thereby responsive to the fuel level in the fuel filler pipe 14 to raise up and seal against a seat 54 when the fuel level in the tank covers the ball element 52. The seat 54, as illustrated, is located below the fuel level at which the refueling valve 22 will operate to shut off. Accordingly, the arrangement of the vertical height of the seat 54 below the fuel level at which the refueling valve floats to close, will prevent fuel flow from spitting back through the filler neck during the refueling operation. The opening area of opening slots 56 in the check ball valve assembly 20 are large enough to prevent fuel flow restriction into the tank during refueling of the fuel tank through the fuel filler pipe 14.

In accordance with another aspect of the present invention, the rollover refueling valve 22 is operative to provide running loss as set forth in our copending U.S. application 08/555,129. The operation of the rollover valve, as set forth in the copending application, is incorporated herein by reference.

During the refueling process, a large volume of air and fuel vapors is displaced in the fuel tank by fuel. Thus, when the refueling process is initiated, the refueling valve must provide large unrestricted passage for the air and fuel vapors to flow from the fuel tank to the vapor recovery system quickly during the refueling process. The refueling valve also must automatically close to restrict vapor flow when the fuel in the fuel tank reaches a predetermined fill level to create a dome pressure above the fuel in the fuel tank which causes fuel to rise in the fill pipe and automatically shut off the fuel fill nozzle in a well known manner or when the tank has only been partially filled with fuel. After the refueling process is completed the dome pressure vents via the running loss valves 24, 78 that provide only a restricted flow path for flow of vapor so as to prevent excessive flow of vapor to the carbon canister such that it will be able to recover for subsequent larger volumes of vapor flow from the refueling valve.

Pressure within the filler neck at the opening 50 is controlled in a manner to be discussed for providing a control point operative to provide an indication of the refueling operation for reasons to be discussed.

In accordance with another aspect of the present invention, the rollover refueling valve 22 is operative to provide running loss as set forth in our copending U.S. application 08/555,129. The operation of the rollover valve as set forth in the copending application is incorporated herein by reference. One such type of fuel vapor recovery system has a fuel vapor canister that captures fuel vapors and a refueling valve and one or more vent valves that are located at or near the top of the fuel tank for handling the fuel vapors in the fuel tank.

During the refueling process, a large volume of air and fuel vapors is displaced in the fuel tank by fuel. Thus when the refueling process is initiated, the refueling valve is open to provide large unrestricted passage for the air and fuel vapors to flow from the fuel tank to the vapor recovery system quickly during the refueling process. The refueling valve also automatically closes at least part way to restrict flow when the fuel in the fuel tank reaches a predetermined fill level to create a dome pressure above the fuel in the fuel tank which causes fuel to rise in the fill pipe and automatically shut off the fuel fill nozzle in a well known manner. After the refueling process is completed the dome pressure vents via the running loss valve that provides only a restricted flow path for flow of vapor so as to prevent excessive flow of vapor to the carbon canister such that it will be able to recover for subsequent larger volumes of vapor flow from the refueling valve.

For purposes of the present invention it is only necessary to describe that the refueling and rollover valve 22 vents fuel vapors to the charcoal canister 28 during refueling with a minimum build-up of tank pressure. When the tank is filled, float 58 in the refueling and rollover valve 22 will raise up to shut off when the fuel level raises to a predetermined calibrated level with respect to the height of the float 58. The float is heavy enough to prevent so-called corking or blowing shut to cause any premature shut off of vapor flow from the fuel tank 18.

The float 58 includes a valve element 60 that is universally mounted on the float to be adjustably seated with respect to a valve seat 62 on a tubular member 64 of a control valve 66 that is integrally formed with the rollover valve 22 to accomplish one of the objectives of the present invention, namely to provide a system for preventing the escape of vapor from the filler neck during the fuel filling operation and to shut off the valve 22 when the tank is partially filled.

In the illustrated arrangement, spring 68 positions the valve element 60 to prevent the valve element form pivoting too far from one side to the other so as not to seal against the valve seat 62 on the tubular member or vent tube 64. The length of the vent tube 64 and the buoyancy of the float 58 determine the amount of the vapor dome height that is ultimately established within the fuel tank once it is filled.

In the illustrated arrangement, the rollover refueling vent valve 22 is protected against rollover by a ball element 70 that is ramped on an end cap 72 on the float 58 and the angle on the cap cage element 74 combine to determine at what rollover angle will cause the valve element 60 to close.

A baffle 76 prevents liquid fuel from passing from the fuel tank and into the charcoal canister as more specifically disclosed in our copending U.S. patent application 08/555, 129.

The running vent valve or valves on the other hand provide restricted passages from the fuel tank to the vapor recovery system which allow a low volume of fuel vapors to escape while guarding against liquid fuel contamination of the fuel vapor canister. The running vent valves 24, 78 also close automatically when the fuel level in the fuel tank rises to a predetermined level.

A potential problem occurs in a fuel vapor recovery system of this type when a vent valve is located above the refueling valve so that the vent valve is open when fuel in the fuel reaches the fill level during the refueling process. Such an open vent valve can effect the dome pressure and delay the automatic shut off of the fuel filler nozzle so that the fuel tank may possibly be over filled.

A running loss valve 78 is located above the shut off fuel level and is thereby able to provide vapor loss from the tank during vehicle running when the refueling valve is otherwise shut by the float control valve element 60. The rate that the fuel tank is vented is regulated by the size of a seat orifice 80 in the running loss vent valve 78. In the running loss valve 78 a float 82 is buoyantly floated and a spring load is provided for centering when the fuel level gets up to the height of the float 82 of the running loss valve 78. In the case of vehicle rollover, a spring 84 located in a pocket 86 with the float 82 is sized such that it will combine with the buoyancy of float 82 to help seal the seat orifice 80 on vehicle rollover.

The vapor flow out of the fuel tank 18 during refueling is through vapor passages 88, 90. These passages are large enough to avoid any flow restrictions during refueling.

In the illustrated system 10, a separate rollover valve 24 is provided. It is similar to the running loss valve 78, however, it depends on the shape of the fuel tank on its location and arrangement and is provided to minimize the tank pressure in the fuel tank when the other valves are floated shut.

The rollover refueling vent valve 22 is open during refueling due to the operation of the control valve 66 that is incorporated therein. The control valve 66 operates to communicate passages 88, 90 to provide a large unrestricted flow path from the fuel tank 18 to the charcoal canister 28. This large unrestricted flow path provides a pressure relief for any vapor pressure in the fuel tank as the refueling process is initiated and an escape path for the air and fuel vapors in the fuel tank as the fuel tank is filled with fuel during the refueling process itself.

The control valve 66 is activated when fuel fill occurs. Once the fuel cap is removed from the fuel filler pipe 14 and the fuel nozzle (not shown) is inserted into the open end of the fuel filler pipe module 12, the trap door 40 is opened and the nozzle is inserted therein to be sealed by the annular seal 44. Government regulations require that the fuel nozzle shut off automatically and the operation of such government mandated fuel nozzles are well known.

As previously stated, during the refueling process the fuel level in the fuel tank 18 rises until the fuel reaches a predetermined fill level as shown in FIG. 1. As the fuel nears the fill level, the float 58 of the refueling valve 22 rises to cause the valve 60 to seal against the valve seat 62. This restricts the outlet passage 96 causing a build up of dome pressure, that is the pressure of the air and fuel vapors that are trapped in the top of the fuel tank 12 above the fuel. This dome pressure in turn causes the fuel that is delivered by the fuel fill nozzle to rise up in the filler pipe 14 above the level of the fuel in the fuel tank until the fuel level in the fuel filler pipe 14 is high enough to shut off the fuel fill nozzle automatically.

In the illustrated arrangement, in addition to providing a vapor recovery system 10 as set forth above, the integrated control valve 66 is operative during refueling to assure that the vent passage 90 will only be open during the process of refueling the fuel tank. The control valve 66 more particularly includes the tubular member or vent tube 64 that has a valve seat 62 on one end thereof that is controlled by the valve element 60 on the float 58 and further includes a second valve seat 100 on an extension 102 of the vent tube 64. The second valve seat 100 is located within a valve body 104 that provides a cavity 106 communicating with an outlet fitting 108 that defines the vent passage 90 connected by tubing 110, 112 to the inlet of the charcoal canister 28. Tubing 112 also connects an outlet 92 on running vent valve 24 to the canister 28.

The vent passage 90 has a large diameter flow area for the flow of vapor from the fuel tank through the vent tube 64 and cavity 106 during the refueling operation.

A valve cover 114 is connected to the valve body 104 by screws 94. The valve cover 114 is sealed with respect to the valve body 104 by an annular seal 96 on the outer periphery of a diaphragm 98. The cover 114 has a passage 115 therein connected to an inlet tube 116. The inlet tube 116 is connected by a tube or conduit 118 to the pressure sensing port 50 for reasons to be discussed.

The cover 114 encloses a conically configured biasing spring 120 that is interposed between the cover 114 at circumferentially spaced arcuate ribs 122 thereon and the upper surface of diaphragm 98 to cause the diaphragm to flex toward the vent tube extension 102 when the filler neck is closed. The flexible diaphragm 98 carries an annular seal element 124 on the opposite surface thereof that is normally closed by the spring 120 against the second valve seat 100.

The pressure sensing port 50 is located below the trap door in the filler neck module 12. Thus, when the trap door 40 is closed when the fuel nozzle has been removed from the filler neck, the entire system 10 is at an equalized pressure. Under this condition, the spring 120 will bias the diaphragm 98 to force the seal element 124 closed against the second valve seat 100. This will close the vent port defined by the vent tube 64 and will cause the vapor venting of the tank to be through the running loss valve 78, thereby to control vapor loss during normal running operation of the vehicle.

The spring 120 and the flexible diaphragm 98 are responsive to reduced pressure conditions produced as fuel flows across the venturi 45 at the port 50 to cause the diaphragm 98 to move upwardly against the force of the spring 120 and thereby lift the valve seal element 124 from the valve seat 100 to provide an unrestricted vapor flow path for venting to the charcoal canister, when refueling, through the vent passage 90. After the refueling process is completed, the fuel nozzle is withdrawn, the fuel cap 15 is attached to close the fuel filler pipe 14 and the access door 16 is closed.

By virtue of the aforedescribed system, when the fuel tank is being refilled the liquid seal 16 will prevent vapors from escaping to atmosphere and at the same time will cause a low pressure condition to occur at the port 50 to provide a desired vapor flow through the refueling vent valve 22 during the refueling operation. The vapors are then filtered in the charcoal canister and clean air is vented to atmosphere through the canister vent solenoid which is normally open and operative in accordance with the purge cycle rate to draw clean air through the charcoal canister and to direct such collected vapors back into the fuel system of the vehicle.

The disclosed embodiment is representative of a presently preferred form of the invention, but is intended to be illustrative rather than definitive thereof. The invention has been described in an illustrative manner with respect to one embodiment, and it is to be understood that the terminology that has been used is intended to be in the nature of words of description rather than of limitation. Obviously, many modifications and variations of the present invention in light of the above teachings may be made. For example, the invention has been illustrated as adapted to a vent valve assembly wherein the valve is operated with a float but the valve Could also be operated with a gravity device that responds to tilting of the tank to close the orifice. Or the valve could be omitted altogether according to a particular motor vehicle fuel tank requirement. It is therefore to be understood that within the scope of the appended claims, the invention may be practiced otherwise than as specifically shown and described. Further, while the control valve 66 is shown integrated on valve 22, it is understood that it can be interposed as a separate control element.

What is claimed is:

1. A vapor recovery system for an automotive fuel tank having a refueling valve communicated with a vapor storage canister, a float valve in the refueling valve, a filler neck having a trap door for sealing the filler neck when a fuel nozzle is removed;

a liquid seal in said filler neck;

a pressure sensing port in said filler neck located between said trap door and said liquid seal and operative during fuel fill to sense a below atmospheric pressure condition in said filler neck;

a control valve comprising a valve body having a chamber;

a first passage connecting said chamber to the refueling valve;

a second passage connecting to said pressure sensing port;

a diaphragm separating said first and second passages and sealing said first and second passages from one another;

an outlet for connecting said chamber to a vapor storage canister;

a vent tube that has a first valve seat on one end thereof and a second valve seat on the other end thereof that cooperate respectively with said float valve and said diaphragm to control vapor venting from the fuel tank to the charcoal canister;

said diaphragm being moved in response to a predetermined pressure at said pressure sensing port to open communication between said first passage and said outlet for vapor flow out of the fuel tank during refueling.

2. The vapor recovery system in claim 1 wherein said control valve is activated responsive to a reduced pressure in the filler neck when the trap door is opened and fuel flows through said filler neck.

3. The vapor recovery system in claim 1 wherein said liquid seal includes a venturi that is operative in response to fuel flow through skid filler neck to cause a below atmospheric pressure condition at said pressure sensing port for biasing said diaphragm to open said first passage to communicate it with said chamber and said outlet for flow of vapors from said tank to said vapor storage canister and said below atmospheric pressure condition preventing escape of vapors to atmosphere through said filler neck.

4. The vapor recovery system of claim 1 further comprising a valve seal element on said diaphragm.

5. The vapor recovery system of claim 4 further comprising a spring engaged with said diaphragm on the opposite side thereof from said valve seal element.

6. The vapor recovery system of claim 1 further comprising a valve seal element on said diaphragm selectively engageable with said second valve seat and a spring engaged with said diaphragm for biasing said valve seal element closed against said second valve seat when no fuel is flowing through said filler neck.

7. The vapor recovery system of claim 1 wherein said control valve includes a cover having an inlet connected thereto; a tube connecting said inlet to said pressure sensing port for directing a predetermined control pressure against one side of said diaphragm to open the refueling valve to allow vapors to be vented from the fuel tank to the vapor storage canister during refueling.

8. The vapor recovery system of claim 3 wherein said control valve includes a cover having an inlet connected thereto; a tube connecting said inlet to said pressure sensing port for directing a predetermined control pressure against one side of said diaphragm to open the refueling valve to allow vapors to be vented from the fuel tank to the vapor storage canister during refueling and to prevent the escape of fuel vapors from the filler neck.

9. The vapor recovery system of claim 1 further comprising a back-flow check valve operative to prevent backflow of liquid fuel to said pressure sensing port for maintaining it open for sensing a predetermined pressure during fuel flow so as to condition the diaphragm to maintain open communication between said first passage and said outlet during refueling.

10. A refueling valve for a vapor recovery system for a fuel tank having a vapor storage canister communicating with the fuel tank via the refueling valve and a filler neck for refueling the fuel tank that has a pressure sending port, the refueling valve having a float valve and an integrated control valve comprising;

a valve body having a first chamber and a second chamber;

a diaphragm in the valve body separating and sealing said first and second chambers from one another;

a first passage connecting the first chamber to the float valve including a vent tube having one end disposed in said first chamber and an opposite end projecting out of the first chamber and into the float valve for closure by a float valve element;

the one end of the vent tube being engaged by the diaphragm to close communication between the vent tube and the first chamber;

an outlet in the valve body for connecting the first chamber to the vapor storage canister;

a second passage in the valve body for connecting the second chamber to the pressure sensing port of the fuel filler neck so that the diaphragm is moved away from the one end of the tube in response to a predetermined pressure at said pressure sensing port to open communication between the float valve and the outlet for vapor flow out of the fuel tank during refueling.

11. The refueling valve as defined in claim 10 wherein the valve body is coaxially arranged with the float valve and the vent tube is straight.

12. The refueling valve as defined in claim 10 further comprising a spring disposed in the second chamber and biasing the diaphragm into closing engagement with the one end of the tube that is disposed in the first chamber.

13. The refueling valve as defined in claim 10 further comprising a valve seal element on the diaphragm selectively engageable with the one end of the tube that is disposed in the first chamber and a spring engaging the diaphragm and biasing the valve seal element closed against the one end of the tube.

* * * * *